March 6, 1928.  1,661,617

J. MONFORTS

SHEARING MACHINE

Filed April 19, 1927   2 Sheets-Sheet 1

Inventor
Joseph Monforts
By Knight Bros
Attys

March 6, 1928. 1,661,617
J. MONFORTS
SHEARING MACHINE
Filed April 19, 1927 2 Sheets-Sheet 2
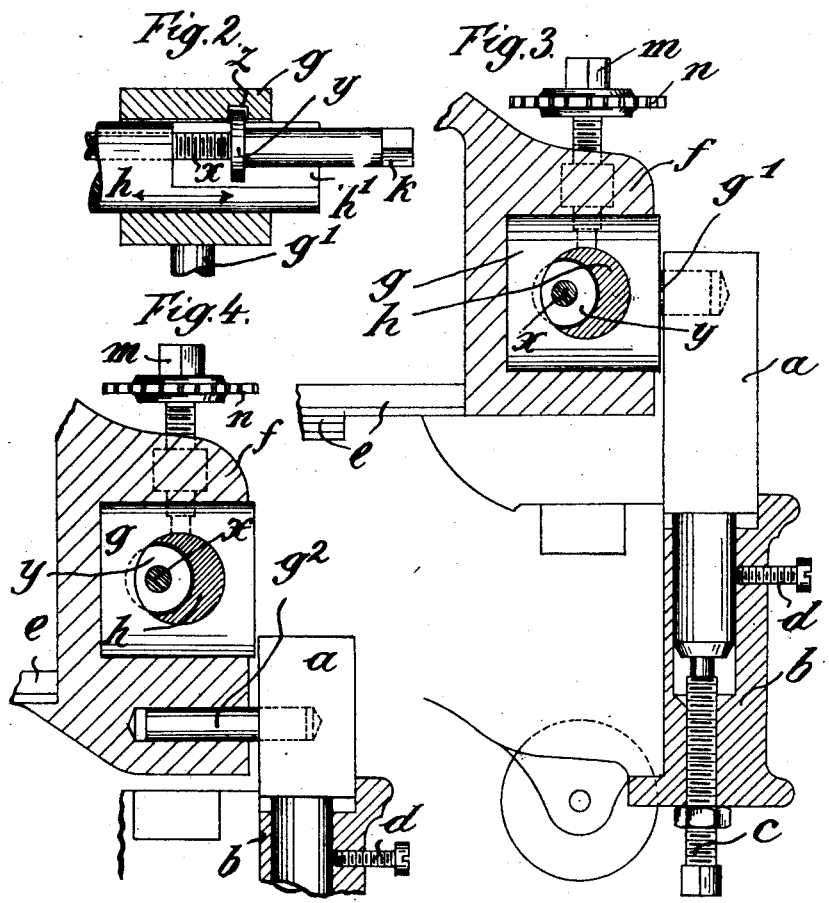

Patented Mar. 6, 1928.

1,661,617

UNITED STATES PATENT OFFICE.

JOSEPH MONFORTS, OF MUNICH-GLADBACH, GERMANY.

SHEARING MACHINE.

Application filed April 19, 1927, Serial No. 185,030, and in Germany February 23, 1926.

In the shearing machines hitherto known the bearings for the cutter cylinder are arranged in a body of about U-shape between two supporting screws so as to be adjusted up and down. The body itself is arranged on the carrier of the lower cutter so as to be shifted normally to the axle of the cutter cylinder and about in parallel with the lower cutter. The whole arrangement is further adapted to rock about journals of the carrier of the lower cutter in order to throw the whole cutting mechanism out of the range of the fed material to be shorn, when a seam in the latter approaches. This known arrangement is very complicated both in structure and attendance. In order to simplify in both these directions machines of the type mentioned, the cutter cylinder axle is mounted on arms which are adapted to rock in the lower cutter carrier about journals and to be shifted in longitudinal direction relatively to these journals, said journals further eventually enabling the raising or lowering of the whole shearing mechanism when a seam approaches in the material to be shorn. All adjusting possibilities are thus united in a sole member.

In order that my invention may be more easily understood, two preferred embodiments of the subject-matter of same are illustrated in the drawing which accompanies and forms part of this specification. In this drawing:

Fig. 2 is a section on the line A—B of Fig. 1, of a detail thereof,

Fig. 3 is a fragmentary front view corresponding to Fig. 1, while

Fig. 4 shows the elements referred to of the second embodiment.

Figure 1:
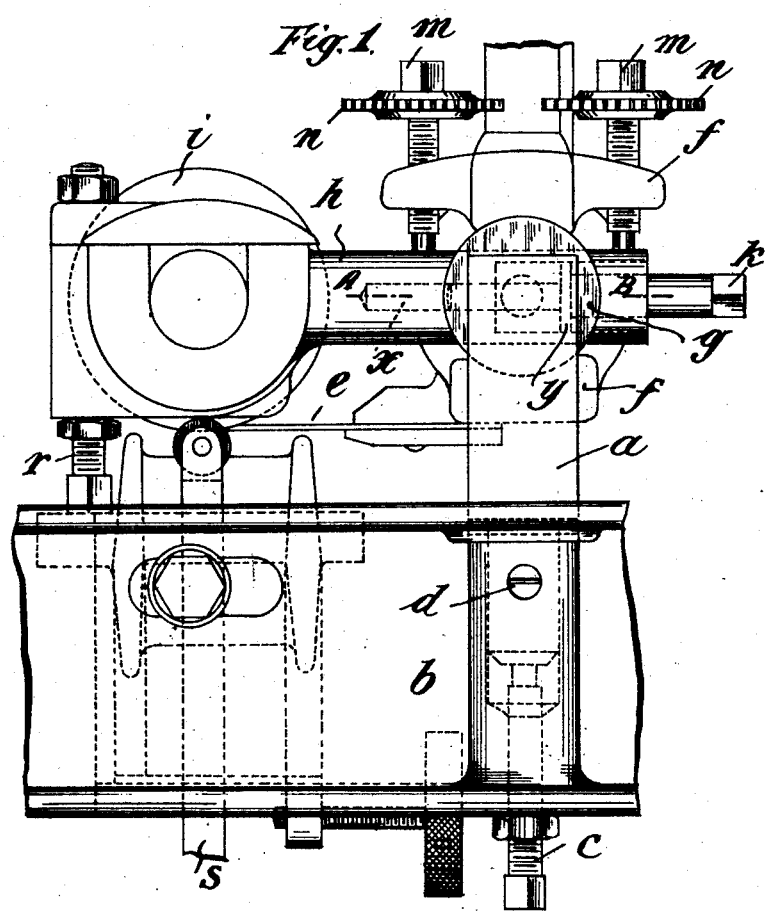
Fig. 1 is an elevation of the first embodiment.

$a$ denotes one of the carriers of the shearing mechanism which consists of a stationary blade $e$ and a rotary cutter $i$. The carriers are adapted to be adjusted in vertical direction relatively to the machine frame $b$ by means of spindles $c$, Figs. 1 and 3, and to be fixed in position by a set screw $d$. The blade $e$ is carried by two lateral heads $f$, of which only one is shown each constituting a bearing for a journal $g$, these bearings being open on two sides, see Fig. 1. The journals $g$ in their turn have diametrically arranged in them each a bearing arm $h$ for the cutter cylinder $i$. The arms $h$ are capable of being shifted longitudinally and exactly fixed in position by set screws $k$.

As can be seen from Figs. 2 and 3, each journal $g$ carries a lateral journal $g^1$ by means of which it is rotatably mounted in the respective carrier $a$ at each side of the shearing mechanism. To adjust the cutter cylinder $i$ in vertical direction, the bearing arms $h$ can be rocked together with their journals $g$ by means of set screws $m$ the heads of which preferably are finely toothed at their periphery in known manner so as to form ratchet wheels which are engaged by spring-actuated locking pawls, or said set screws $m$ carry sprocket wheels $n$, as shown in Fig. 1, interconnected by a chain so as to secure a simultaneous adjustment of both screws $m$.

In the modification illustrated in Fig. 4 instead of the journals $g^1$ the heads $f$ have each a journal $g^2$ by means of which they may rock about the carriers $a$.

When the cutter cylinder $i$ is to be lifted from or lowered toward the blade $e$, the set screws $m$ are used. When the cutter cylinder is to be adjusted in the longitudinal direction of the bearing arms $h$ toward the blade $e$, then spindles $x$ are used which are eccentrically mounted in the arms $h$, as can be seen from Figs. 2, 3, and 4. The spindles $x$ possess a collar $y$ engaging a corresponding recess $z$ of journal $g$ and capable of freely sliding in an eccentric bore $h^1$ of arm $h$. The free ends of the spindles $x$ have squared heads $k$ to be engaged by a spanner. By rotating the spindles $x$ each arm $h$ thus can be shifted in the respective journal $g$. When the whole shearing mechanism is to be adjusted in vertical direction, this is effected by means of the spindles $c$, Figs. 1 and 3, and adjustable supporting screws $r$. When, finally, the mechanism is to be thrown out of operation in case a seam in the fabric approaches, the lifting operation then required is executed by means of thrust rods $s$, Fig. 1, abutting against the arms $h$, the whole mechanism then rocking about the journals $g^1$ or $g^2$.

What I claim and desire to secure by Letters Patent, is:—

1. In a machine of the class described, a machine frame and a shearing mechanism rockably mounted thereon, said shearing mechanism comprising a stationary blade, bearings secured to the ends of said blade, journals in said bearings having diametrical bores, supporting arms resting in said bores, a rotary cutter mounted on said arms and adapted to cooperate with said blade. and means for adjusting and fixing the position of said journals in said bearings.

2. In a machine of the class described, a machine frame and a shearing mechanism rockably mounted thereon, said shearing mechanism comprising a stationary blade, bearings secured to the ends of said blade, journals in said bearings having diametrical bores, supporting arms resting in said bores, a rotary cutter mounted on said arms and adapted to cooperate with said blade, means for adjusting and fixing the position of said journals in said bearings, and means for adjusting and fixing the longitudinal position of said supporting arms in said journals.

3. In a machine of the class described, a machine frame, a shearing mechanism rockably mounted thereon, and means for rocking said shearing mechanism, said shearing mechanism comprising a stationary blade, bearings secured to the ends of said blade, journals in said bearings having diametrical bores, supporting arms resting in said bores, a rotary cutter mounted on said arms and adapted to cooperate with said blade, and means for adjusting and fixing the position of said journals in said bearings.

In testimony whereof the foregoing specification is signed.

JOSEPH MONFORTS.